United States Patent [19]

Winchell

[11] Patent Number: 4,552,789
[45] Date of Patent: Nov. 12, 1985

[54] BACKING BOARD INSERT FOR FOOD PACKAGES

[75] Inventor: Jack W. Winchell, Madeira, Ohio

[73] Assignee: Huggitt Packaging Company, Cincinnati, Ohio

[21] Appl. No.: 466,596

[22] Filed: Feb. 15, 1983

[51] Int. Cl.$^4$ ................................................ B32B 3/00
[52] U.S. Cl. ................................... 428/132; 428/204; 428/205; 428/215; 426/121; 426/124; 206/45.14; 156/250; 156/253
[58] Field of Search ............... 426/121, 124, 129, 127; 53/DIG. 1; 428/204, 205, 215, 132; 206/45.14; 156/250, 253

[56] References Cited

U.S. PATENT DOCUMENTS 3,536,501 9/1968 Work .
3,803,332 4/1974 Seiferth et al. .
3,978,260 8/1976 Dobbins et al. .
4,003,184 1/1977 Shiu .

*Primary Examiner*—Marion E. McCamish

*Attorney, Agent, or Firm*—Wood, Herron & Evans

[57] ABSTRACT

An improved L-type backing board insert for supporting food, such as shingled bacon slices, in a film wrapped package is disclosed comprised of a two-ply laminate. An opaque flexible base ply of pigmented plastic material, such as high density polyethylene, is printed on one side and is provided with a mat finish on the other side. A window aperture is formed in the opaque base ply for viewing both sides of a portion of the packaged bacon. A ply of transparent polyolefinic film, such as polypropylene film, is adhered to the base ply, substantially covering the entire printed face and forming a window over the window aperture formed in the base ply. Use of the polypropylene film provides the backing board with a high gloss finish.

The improved two-ply backing board reduces the amount of ink necessary for printing on the backing board, captures the printing between the two layers of the laminate, and yields an inexpensive, flexible and high quality backing board.

10 Claims, 2 Drawing Figures

BACKING BOARD INSERT FOR FOOD PACKAGES

FIELD OF THE INVENTION

This invention relates to support boards for use in food packages, and in particular to L-type backing boards commonly included within vacuum sealed plastic film wrap packages of sliced bacon arranged in a shingled array, a portion of the slices overlapping adjacent slices.

BACKGROUND OF THE INVENTION

Film wrapped packages of foodstuffs such as sliced bacon, ham slices, luncheon meats and the like conventionally utilize a semi-rigid supporting member or backing board on which the typically greasy product is situated within the outer film wrap.

In the packaging of sliced bacon in particular, a widely used technique is to provide a semi-rigid paperboard or fibrous backing board support having a wax or polyolefin resin coating, such as polyethylene, on which a plurality of bacon slices are arranged in edge overlapping or shingled relation. The shingle of bacon is then overwrapped with a transparent packaging film, which is typically evacuated and sealed to or around the backing board. The backing board may be of an L-type which has a perforated score line along one side of the main support portion of the board. The score line defines a flap which is folded over to cover an end portion of the bacon shingle on the backing board such that the lean edge portions of the slices are predominantly displayed for viewing through the transparent overwrap. Such a display of lean edges of the bacon strips in the package makes the product more attractive and consequently more merchantable. A window is ordinarily formed in the main portion of the backing board so that at least a portion of both sides of a bacon slice is visible for customer inspection to fulfill certain government regulations.

Although coated paperboard backing boards have achieved wide acceptance in the industry, there is a tendency for the paperboard to absorb moisture through wicking which occurs from a transfer of water from the moist package product to the backing board. Wicking is a particular problem around the cut perimeter of the backing board, the exposed edges of any windows or openings cut in the backing board, and along the perforations of the score line defining the flap portion. The paperboard backing board can become relatively limp and even warped due to this wicking, and can further become discolored or stained, detracting from the appearance and saleability of the bacon. Limp or warped packages are of course more difficult to handle.

In an effort to avoid the wicking problem which occurs around the window aperture cut in the paperboard, coated paperboard backing boards have been made having a transparent plastic window adhered to the backing board covering the window aperture from the rearward side and adjacent the bacon. It has been found that this back window cover can become unsecured or detached from the coated surface of the backing board thereby defeating its usefulness. Applying the window further requires an additional step in the manufacture of the paperboard backing board, and increases the cost of the finished board.

The other type of backing board commonly used in the marketplace for packaging sliced bacon utilizes a plastic member, which may be of a laminate construction, of a polymeric sheet material. Such material is insensitive to grease and moisture, thus surmounting one of the major problems of the coated paperboard backing board insert.

A transparent polyolefin resin, such as polyethylene, typically forms the base layer for this type of backing board. One or both sides of the base layer will be printed over substantially the entire surface. A certain portion of the base layer is left entirely unprinted to serve as a transparent window area for viewing the bacon. It will be noted that it is generally desired that the portion of the bacon which is not required to be exposed by virtue of packaging regulations should be protected from the deliterious affect of light. For this, as well as merchandising reasons, a large portion of the backing board surface is generally required to be opaque.

One widely used plastic backing board is of a single ply and bears opacifying printing and decoration only on the side which faces away from the bacon shingle. No overcoating of covering material is provided on this printed side to "trap in" the printing. It is an F.D.A. regulation that any printing on a backing board must have a barrier between it and any contained food products such that direct contact cannot occur between the food product and the printing. Although the uncoated printing is spaced from the bacon by the single ply base sheet, the possibility nevertheless exists that direct contact between the bacon and the printing can occur if the bacon wraps around the board in the course of packaging. For this reason, such backing boards with uncoated printing have not achieved widespread acceptance in the industry.

Yet another plastic backing board is a laminate having a transparent core or base layer of polystyrene which is printed on each side with an ink coverage that is complete except in the clear window area. A polyethylene or varnish overcoat is then provided covering the entire printed backing board surface, including the window area, thereby trapping in the printing. Printing on both sides for decorating and opacifying the overall backing board area is asserted to be necessary in this backing board to avoid the tendency of the polystyrene base layer to develop a curl caused by film shrinkage induced by the drying ink. Such curling can cause sealing problems in the packaging, known as leakers, as well as difficulties in handling of the backing boards on conventional high speed bacon packaging machinery. It will be recognized that printing on both sides of the backing board can increase the amount of ink used, compared to printing only on one side, and also requires an overcoat layer on both sides of the board to trap in the printing.

A general consideration for all bacon backing boards is that they be rigid enough to fulfill their support function and permit easy handling by bacon packaging machinery, that they receive printing readily to form an attractive package, and that they be inexpensive to produce. It is also desirable that the insert be relatively soft and flexible in order to promote better vacuum packaging of the bacon shingle and avoid the problem of leakers. Such leakers can be caused by a bacon board insert which fails to stay confined within the vacuum cavity during vacuum packing, moving into the sealing area such that a total seal is not accomplished and the vacuum is ultimately lost or leaked away. In this regard, it is speculated that the relatively inflexible coated paperboard backing board is more prone to forming such leakers than a more pliant plastic board. Leakers can also be caused by punctures to the overwrap itself from burrs or slivers remaining from the die-cutting and perforation steps in manufacture of the L-type bacon backing boards. Leakers are a significant problem in the industry, and a leaker rate of 1% or less is considered very desirable.

SUMMARY OF THE INVENTION

Some of the problems associated with the traditional coated paperboard backing board and the prior art plastic backing boards are solved by this invention in a L-type two-ply backing board which includes a base layer of moisture and grease insensitive pigmented polymeric sheet material, such as high density polyethylene, which is decoratively printed on only one side. The opaque base layer has a window aperture formed therein, with the entire printed surface of the backing board covered with a single ply of a synthetic resin sheet material, such as polypropylene film, to thereby form a two-ply laminate structure with the printing captured between the two plys. The transparent covering ply provides a protective coating for the backing board, and serves as a crystal clear viewing window over the window aperture formed in the backing board. The covering ply further serves to contain any burrs or slivers presented by a perforated hinge line forming the flap of the L-shaped backing board, reducing the chance of leakers.

Use of a pigmented base layer with printing on only one side and a single-ply covering layer of film to capture the printing yields a relatively inexpensive bacon backing board insert which is amenable to easy manufacture. It has been found that using an 8 mil high density polyethylene as the base sheet with a 0.75 mil polypropylene film as the covering laminate is extremely cost effective. Additionally, the polypropylene yields an attractive high gloss finish to the printed face of the backing board. Furthermore, the side of the backing board base layer in contact with the meat is advantageously provided with a mat finish to reduce its tendency to slide on the bacon shingle during packaging. Besides being inexpensive, this choice of materials yields a backing board which provides a good support for the bacon shingle, yet is sufficiently soft and flexible so as to reduce the occurrence of leakers.

The foregoing features and advantages of the present invention will be more readily understood upon consideration of the following detailed description of the invention taken in conjunction with the accompanying drawings, in which:

DESCRIPTION OF A PREFERRED EMBODIMENT OF THE INVENTION

Figure 1:
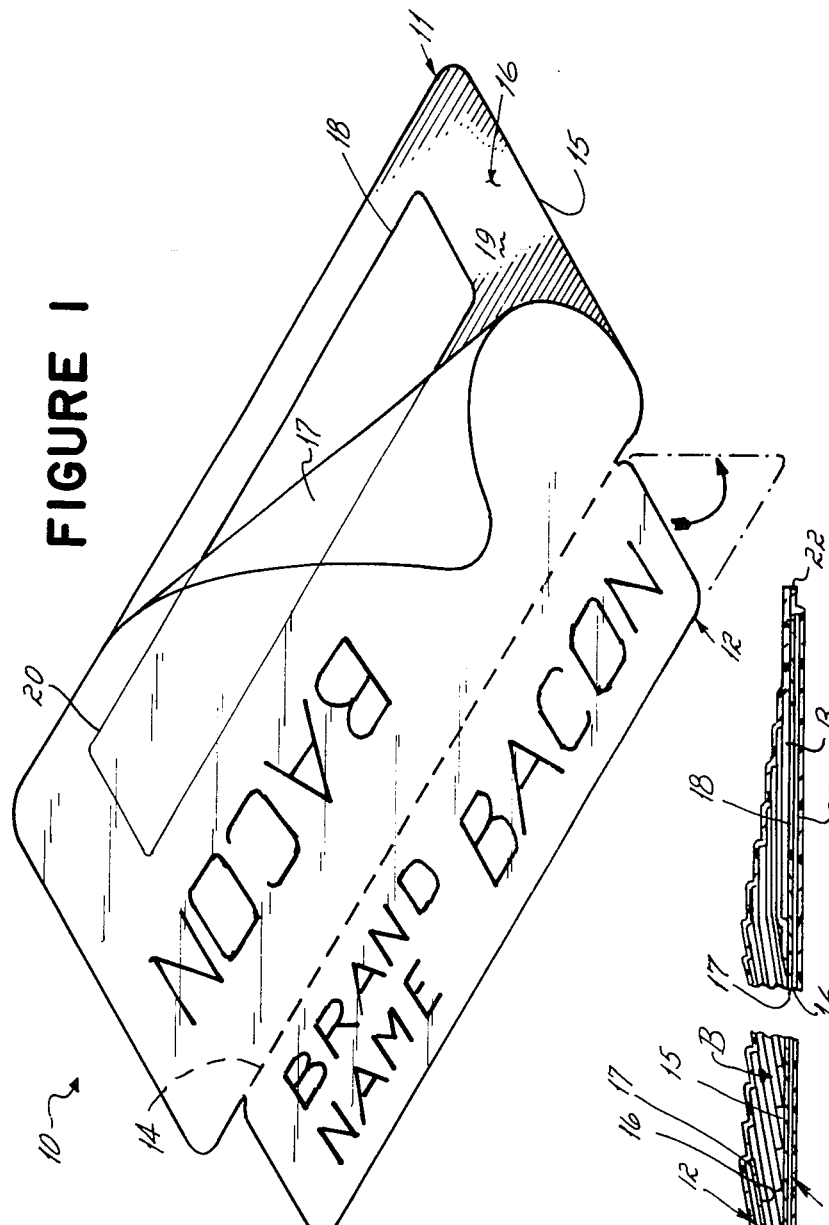
FIG. 1 is a perspective view of a preferred embodiment of the backing board of this invention.
Figure 2:
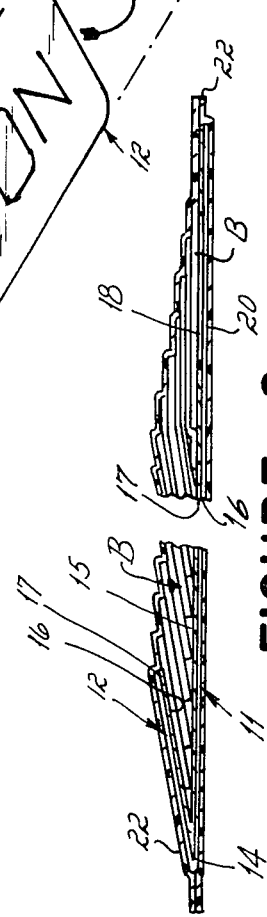
FIG. 2 is a cross-sectional view of a bacon package incorporating the backing board of FIG. 1.

Referring to FIG. 1, a backing board insert for a bacon package is generally indicated at 10. The backing board 10 is of an L-type and has a generally rectangular main portion 11 and a generally rectangular flap portion 12 provided along a side which is adapted to be folded along a perforated score line 14 in the manner indicated by the arrow. A plurality of bacon slices or strips B (FIG. 2) arranged in shingled relation is supported on the interior facing side 15 of the main portion 11. The flap 12 when folded over the bacon B will ordinarily overlie the last or topmost bacon slice in the shingle.

The L-type backing board 10 is a laminate comprised of a base ply 16 and a covering ply 17. The base ply is made from flexible plastic sheet material which is substantially impervious to moisture. High density polyethylene film having a width of about 8 mils has been advantageously used as the base ply material. High density polyethylene besides being tough yet flexible, has a number of other desirable characteristics, in that it has been approved for use in food packaging by the Food and Drug Administration, is relatively inexpensive and can be provided with a mat finish on the side 15 facing the bacon. This mat finish serves to keep the backing board 10 in position on the bacon shingle during packaging.

The base ply 16 is pigmented in order to provide the backing board 10 with the opacity desired. A window aperture 18 is consequently formed, as by die cutting, in the main portion 11 of the backing board to provide the view of a bacon slice which is required by federal regulations.

Printed indicia and decoration is then applied as desired on the outward facing surface 19 of the backing board 10. The printing need not be continuous over the surface of side 19, and is made using inks known to be satisfactory for printing on polyethylene.

With the printing applied and the window aperture formed, a covering and protective ply of polymeric material 17 is secured over the entire printed face 19 of the backing board 10. The printing ink applied to the surface 19 is thus captured between the two plys 16 and 17 eliminating the possibility of direct contact between the printing and the bacon which might occur through bacon overlapping the edge of the package, or the backing board became doubled over, etc. Polypropylene film of about 0.75 mil thickness has been advantageously employed as the covering ply 17, due in part to the fact that it is relatively inexpensive, is approved by the FDA, and yields a glossy finish to the printed surface 19 of the backing board 10. In addition, the polypropylene ply 17 forms a crystal clear window 20 over the window aperture 18.

The covering ply 17 can be adhesively secured to the base layer or ply 16 using a conventional adhesive applied in a thin coat to the base layer and which dries relatively transparent. The covering layer 17 further provides a protective coating imparting scuff and rub resistance to the printed matter on the backing board 10. It will be noted that the covering ply 17 is continuous over the entire surface 19 and covers the perforations of the score line 14. This serves to form a relatively smooth edge to the main portion 11 of the backing board 10 with the flap portion 12 folded in packaged position, thereby preventing the formation of leakers caused by burrs or slivers presented by the perforations.

An overwrap 22 (FIG. 2) covering the bacon shingle and the backing board 10 is a suitable transparent plastic film material which is preferably gas impermeable. The overwrap 22 will ordinarily be vacuumized and sealed surrounding the bacon shingle and the backing board 10.

The laminate structure thus formed is then cut to the L-type backing board shape, such as by die-cutting. The backing board produced can be readily handled by high-speed packaging machinery, and has smooth, cleanly cut edges which which present no slivers or other debris from the die-cutting operation to contaminate the product being packaged or puncture the overwrap film producing leakers.

The two-ply backing board of this invention yields an all plastic insert which is not susceptible to moisture absorption and therefore eliminates the problem of wicking, such as is characteristic of paperboard or fibrous backing board presently in use in the industry. The backing board of this invention further utilizes a base layer which is printed only on one side, with the printing captured by a covering ply of polymaric material. Captured printing eliminates the possibility of the printing coming in contact with the food products supported on the backing board. Further, since the base layer is rendered opaque by pigmentation, printing is only required on one side of the base layer, and need be for decoration or illustration only. This reduces the amount of printing ink required, as well as any perceived necessity of printing on both sides of the base layer in order to prevent unwanted curl. The preferred combination of high density polyethylene for the base layer and polypropylene as the covering layer further yields a backing board of minimal thickness which possesses sufficient rigidity to support the product placed thereon, yet is relatively pliable. This flexibility is presently considered to enhance the sure vacuum packaging of the insert and bacon with a reduction in leakers. It will be recognized that thicker or thinner base plys 16 and covering plys 17 may be used other than those described herein, the thicknesses indicated here being considered optimum at this time for these materials in terms of cost and desired flexibility of the backing board.

While the invention has been described in connection with a certain presently preferred embodiment, it will be immediately obvious to those skilled in the art that many modifications of structure, arrangement, portions, elements, materials and components can be used in the practice of the invention without departing from the principle of this invention.

What is claimed is:

1. An insert for packaging of a moisture laden food product within a vacuum sealed film wrapper comprising:
    a substantially planar base ply of high density polyethylene which is pigmented to render it substantially opaque, the base ply bearing printed matter on a face thereof,
    a window aperture formed in the base ply, and
    a ply of transparent polypropylene film adhered to the base ply and substantially covering the printed face of the base ply, the polypropylene ply forming a gas barrier window over said window aperture of the base ply.

2. The packaging insert of claim 1 wherein the insert is an L-type insert, the base ply having a major portion which is substantially rectangular in shape, and a flap portion, the flap portion being foldable along a score line extending along an edge of the major portion, the polypropylene ply covering the score line along one side thereof.

3. The packaging insert of claim 2 wherein the high density polyethylene is about 8 mils in thickness and the polypropylene ply is about 0.75 mils in thickness.

4. An improved L-type backing board for packaging of bacon within a vacuum sealed film wrapper, comprising:
    a flexible and resilient base ply which is pigmented to render it substantially opaque, the base ply being substantially planar and having a main portion and a flap portion, the flap portion being connected to the main portion along a perforated hinge line, the base ply being substantially made of high density polyethylene,
    printed matter on only one face of the base ply and a mat finish on the other face,
    a window aperture formed in the main portion of the base ply, and
    a ply of flexible and resilient transparent polypropylene film adhered to the base ply and covering substantially all the printed face of the base ply, the polypropylene ply further forming a window over said window aperture of the base ply.

5. A backing board of claim 4 wherein the polypropylene ply is continuous over the base ply face and covers the perforations of the hinge line on said face such that a smooth burr-free edge is presented when the flap is folded for use of the backing board.

6. A backing board of claim 5 wherein the high density polyethylene base ply has a thickness of about 8 mils, and the polypropylene ply has a thickness of about 0.75 mils.

7. An insert for packaging of a moisture laden food product within a vacuum sealed film wrapper comprising:
    a substantially planar base ply of flexible and soft polymeric sheet material which is pigmented to render it substantially opaque, the base ply bearing printed matter on a face thereof,
    a window aperture formed in the base ply,
    a ply of transparent flexible polymeric film adhered to the base ply and substantially covering the printed face of the base ply, the flexible polymeric ply forming a window over said window aperture of the base ply,
    said base ply comprising high density polyethylene, having a thickness of about 8 mils, and
    the covering ply comprising polypropylene, having a thickness of about 0.75 mils.

8. The packaging insert of claim 7 wherein the insert is an L-type insert, the base ply having a major portion which is substantially rectangular in shape, and a flap portion, the flap portion being foldable along a score line extending along an edge of the major portion, the covering ply overlying the score line along one side thereof.

9. A method for making a L-type insert for the packaging of bacon, comprising the steps of:
    providing a flexible sheet material of high density polyethylene which is pigmented rendering it substantially opaque for the base of the insert, the base sheet material having a mat finish on one side,
    forming a score line across the base material to define a main portion of the flap portion for the insert,
    printing on one side of the base material,
    forming a window aperture in the base material,
    bonding a thin, resilient and continuous layer of polypropylene over the entire surface of the printed side of the base material thereby capturing the printing between the base material and the polypropylene layer, and
    die-cutting the base material bonded polypropylene layer to L-type insert shape.

10. The method of claim 7 wherein the window aperture is die-cut, and the layer of polypropylene is a polypropylene film which is adhesively bonded to the base material.

* * * * *